H. F. SOMMER.
BAKE OVEN.
APPLICATION FILED MAR. 22, 1920.
1,425,709.
Patented Aug. 15, 1922.
5 SHEETS—SHEET 4.
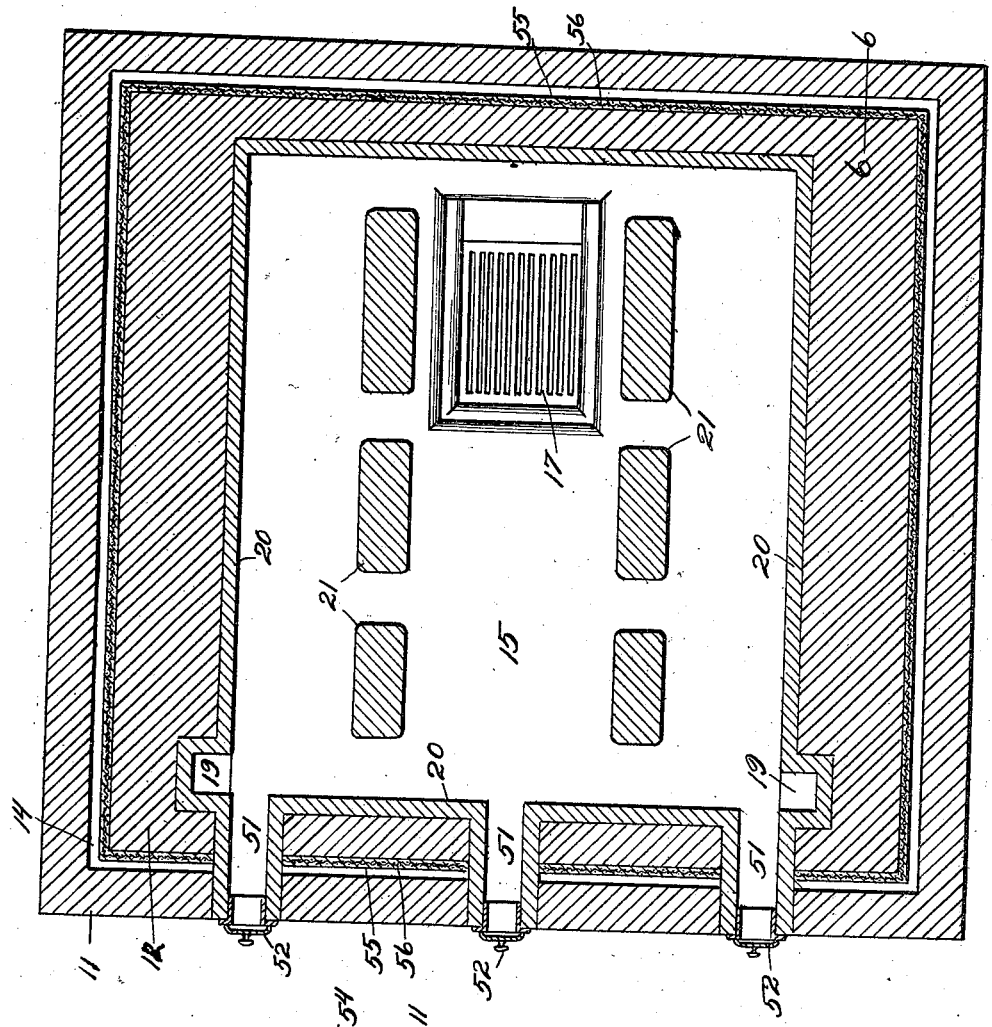
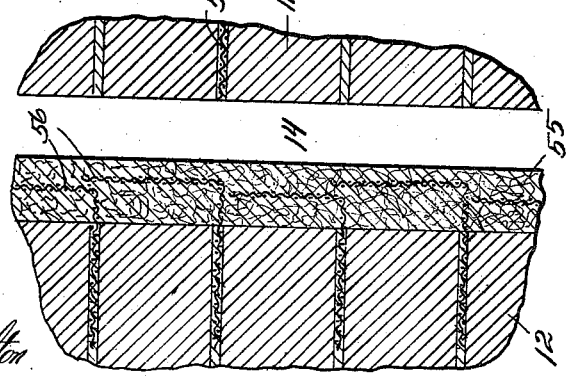

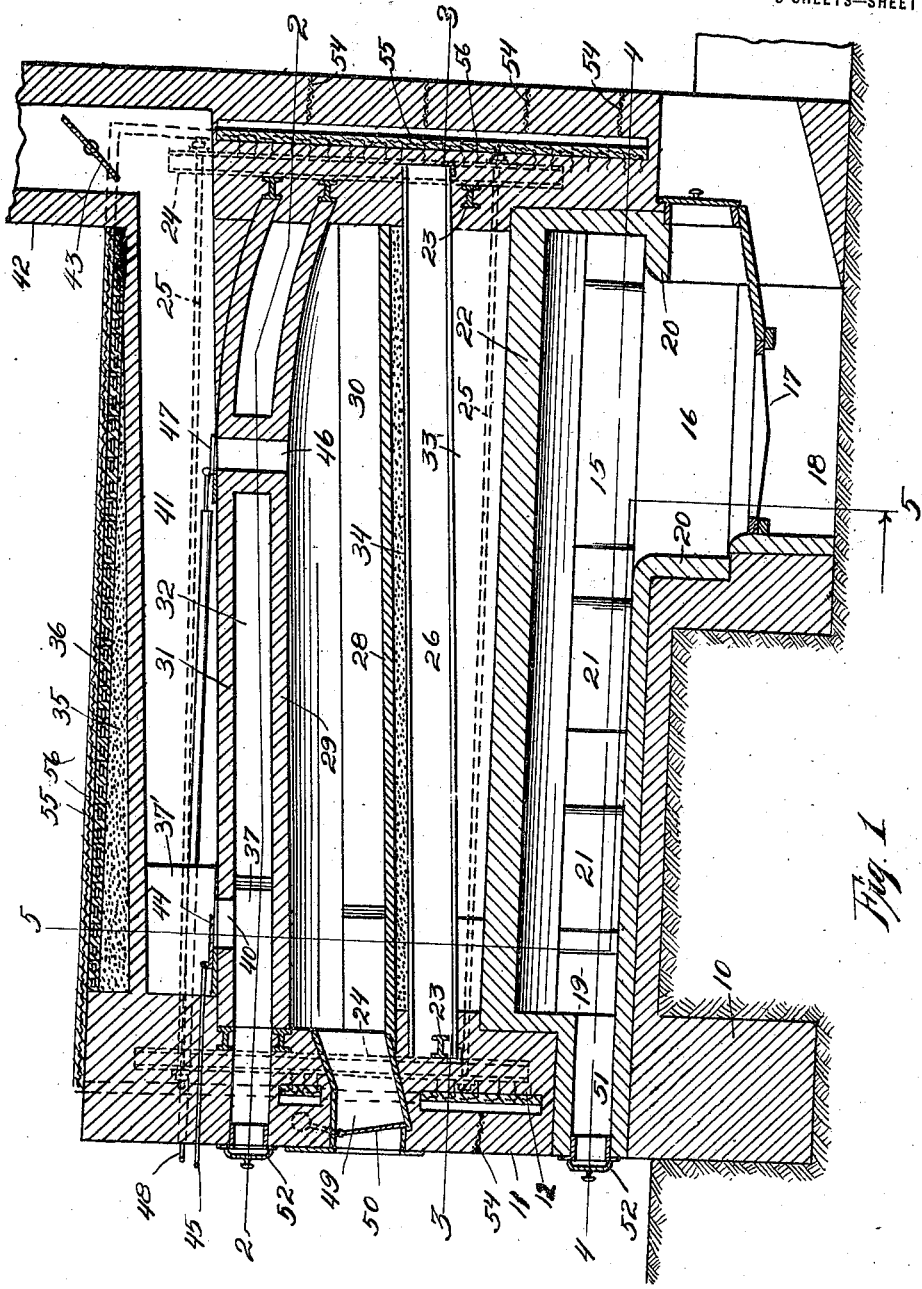

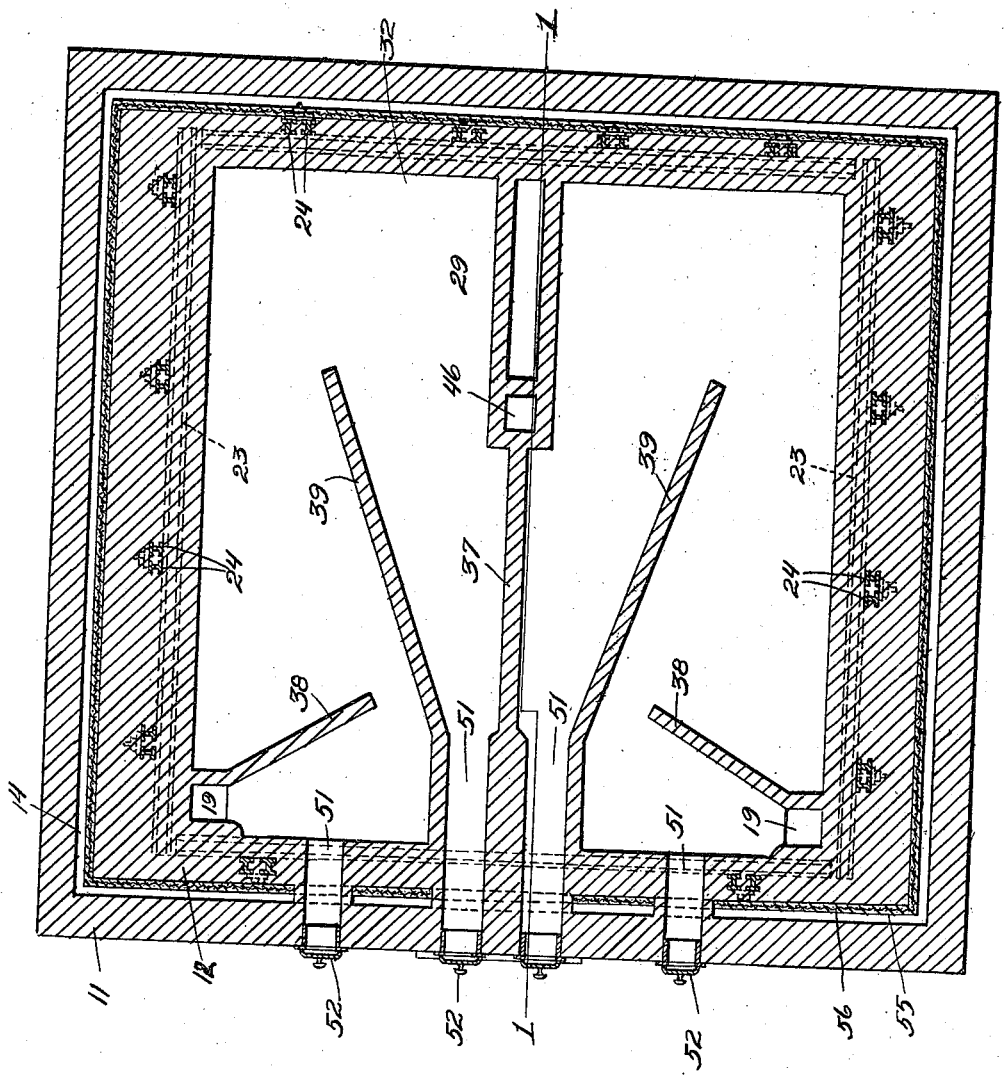

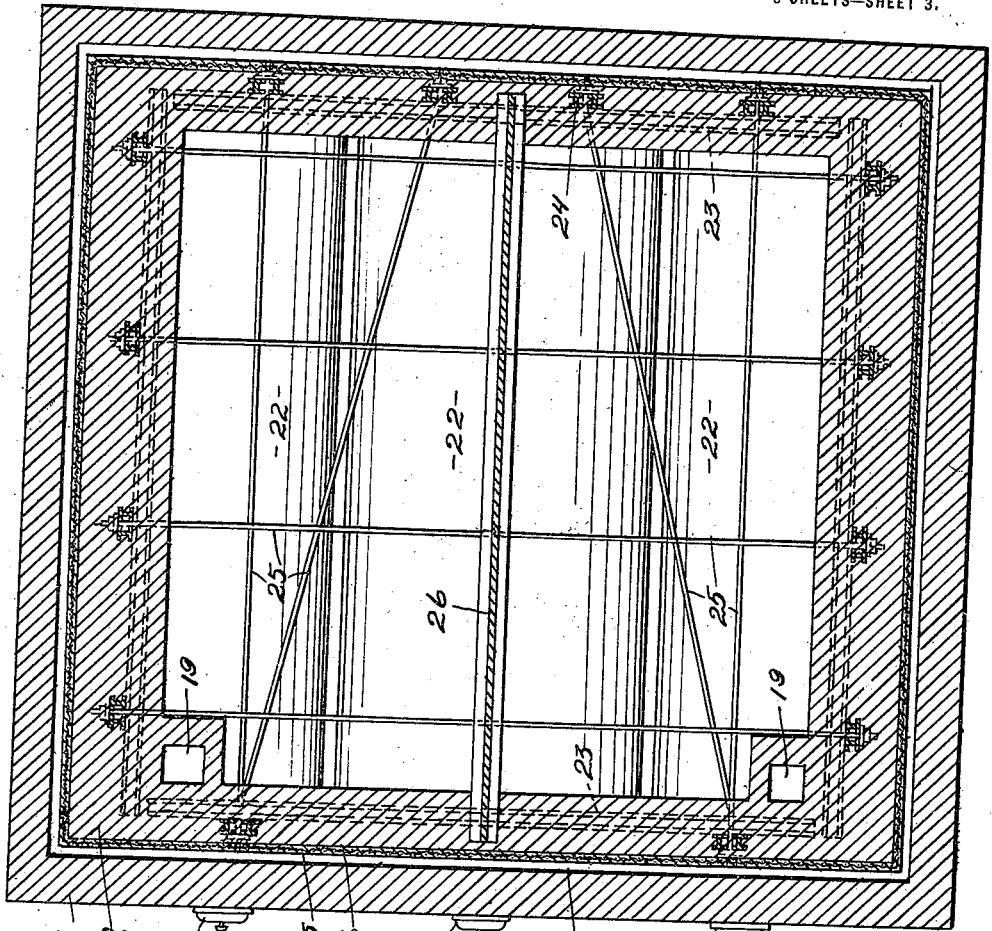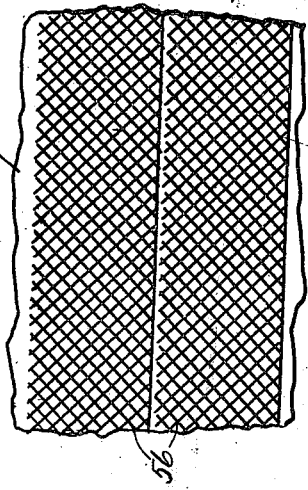

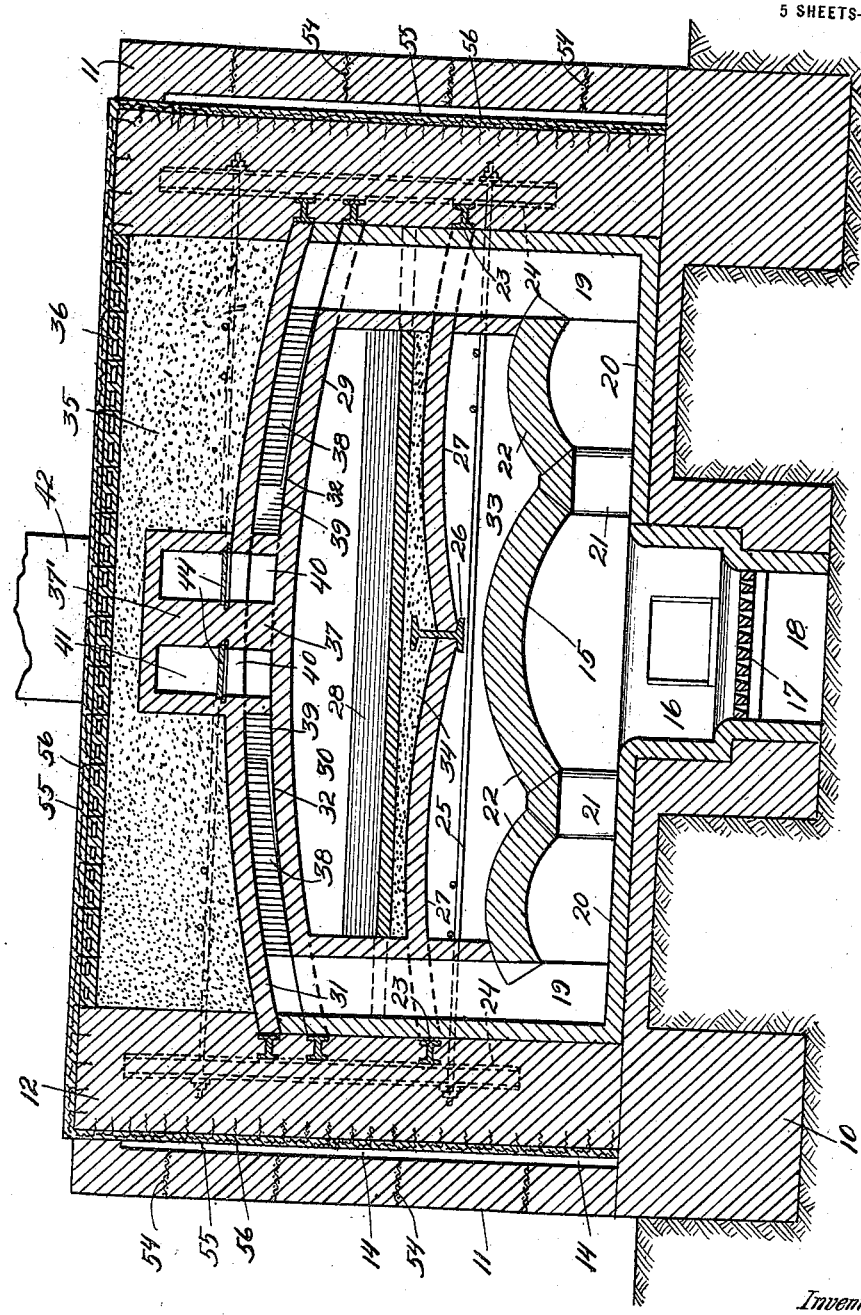

UNITED STATES PATENT OFFICE.

HENRY FREDRICK SOMMER, OF KANSAS CITY, MISSOURI.

BAKE OVEN.

1,425,709.   Specification of Letters Patent.   Patented Aug. 15, 1922.

Application filed March 22, 1920. Serial No. 367,619.

*To all whom it may concern:*

Be it known that I, HENRY F. SOMMER, a citizen of the United States, and a resident of Kansas City, county of Jackson, and State of Missouri, have invented a certain new and useful Improvement in Bake Ovens, of which the following is a complete specification.

The present invention relates to baking apparatus, and aims to provide an improved oven structure with a view both of increasing the baking efficiency of the oven and also of prolonging the life of the oven structure itself.

Accordingly, one of the objects in view is to devise an improved construction for the walls of the oven, whereby undue fracturing of the same under the changes in temperature will be prevented, and the heat losses resulting from such wall fractures are likewise eliminated. To this end I provide a novel and effective means of reinforcement for the oven walls by virtue of which the walls are permitted a certain degree of expansion and contraction without injury to the walls, and to an extent which does not result in any appreciable cracks or fissures therein.

A further object of the invention is to provide an improved oven construction having means for regulating or controlling the movement of the heated air about the oven chamber with a view to maintaining that part of said chamber around its feed door sufficiently hotter than the remainder of the chamber for obtaining the most uniform baking results. For this purpose I provide a set of deflecting partitions so arranged as to retard and direct the movement of the air at the necessary points for prolonging the heating action around the feed door end of the oven chamber, so that this end will be maintained at a higher temperature than would otherwise result.

With these general objects in view, the invention will now be described with reference to the accompanying drawings illustrating one form of construction which has been devised for embodying the proposed improvements, after which those features therein deemed to be novel will be particularly set forth and claimed.

In the drawings—

Figure 1 is a vertical sectional view, showing a bake oven structure embodying the present features of improvement, the section being indicated by the line 1—1 of Figure 2;

Figures 2, 3 and 4 are sectional plan views, on a slightly smaller scale, and representing sections taken on the lines 2—2, 3—3 and 4—4, respectively, of Figure 1;

Figure 5 is a vertical sectional view, the section being indicated by the line 5—5 of Figure 1;

Figure 6 is an enlarged sectional detail view, taken on the line 6—6 of Figure 4;

Figure 7 is a similar detail view illustrating the type of metal fabric used for reinforcing the inner wall of the oven and before the cement material is applied; and Figure 8 is a similar detail of a portion of the outer wall, illustrating the type of metal reinforced fabric which is inserted at intervals between the courses of said wall.

Referring now to the said drawings in detail, these illustrate the improved oven construction as comprising a suitable foundation 10, upon which are constructed, of suitable brick-work or the like, an outer wall 11 and an inner wall 12, leaving a suitable dead air space 14 between them. Within the base of the oven structure is constructed a furnace chamber 15 having a fire-box 16 at what may be termed the rear end of the oven, said box being provided with a fire-gate 17 overlying an ash-pit 18, the said fire-box and furnace chamber and the flue passages 19 leading therefrom being all lined with suitable fireclay material 20.

Within the fire chamber 15 is arranged a series of pillars 21 (see Figure 4) supporting several arches 22 forming the roof of the fire or furnace chamber (see Figure 5). The inner wall 12 above referred to is reinforced by a series of horizontal I-beams 23, as well as a plurality of upright I-beams 24, connected by tie-rods 25, while a heavy central I-beam 26 extends longitudinally from front to rear between the end walls of the oven above the central arch 22. This is for the purpose of strengthening the walls for the support of a pair of arches 27 carrying the oven floor 28, the continuous arch 29 forming the roof of the oven chamber 30, and a second continuous arch 31 which forms the roof of the heated air or flue chambers 32 overlying the oven chamber and separated by a central longitudinal partition wall 37. A dead air space 33 is left between the arches 22 and 27, and a filling of sand 34 is placed between the arches 27 and the floor 28 of the oven chamber. The space over the arch 31 is also filled in with sand 35 and topped with a layer of tiling 36, as shown in Figures 1 and 5.

The flue passages 19 lead into the chambers 32 at the front ends thereof, where each chamber 32 is provided with a partition wall 38 extending diagonally rearward from the passage 19 part way across said chamber and terminating short of a second partition wall 39 which extends from the front wall of said chamber straight towards the rear for a short distance and thence diagonally rearward toward the outer wall of the chamber and in the vicinity of the rear end thereof, as illustrated in Figure 2. This provides a baffle structure adapted to retard the movement of the heated air at the front end of each chamber 32, deflecting the flow of air inward across the front end of the chamber and then outward across the middle of the chamber, after which the air-flow may return by way of the inner side of the chamber to an opening 40 communicating with a common flue passage 41 leading to a stack 42 provided with a damper 43. There are two of the openings 40, one for each chamber 32, and the front end of the passage 41 is divided by a short upward extension 37′ of the partition wall 37 (Figures 1 and 5), said openings being provided with dampers 44 having separate regulating rods 45 operable from the front of the oven.

Toward the rear of the oven or baking chamber 30 a steam vent passage 46 is provided through the arches 29 and 31 for the discharge of steam vapors into the flue passage 41, said passage 46 also having a slide damper 47 controlled by a rod 48 from the front of the oven. At the front of the chamber 30 the same is provided with the usual feed passage 49 and swinging door 50 affording access to the chamber for supplying the articles to be baked thereto and for removing the baked product therefrom. A sufficient number of passages 51 are also provided at various points at the front of the oven and in communication with the chambers 15 and 32 for affording access thereto for cleaning purposes, said passages 51 being normally sealed by suitable closure members 52.

One of the principal and most serious troubles experienced with the walls of bake ovens as usually constructed has been in the fracture of the walls with the changing temperature conditions, resulting in cracks or fissures which materially lessen the efficiency of the oven, due to the diminished heat-retaining properties of the walls. For overcoming this difficulty I have introduced improved features of construction in both the inner and outer walls 11 and 12 of the present oven, by which the tendency of said walls to break and crack is to a great extent eliminated. Referring to Figures 1, 5 and 6, it will be seen that at intervals in the outer wall 11 I introduce layers of suitable metal fabric material 54, in the mortar between the courses of the brick-work, the essential result being accomplished by inserting the metal fabric at intervals corresponding to about every sixth or seventh course of the brick material. Preferably I lay the fabric so that the lines of the fabric extend directly transversely and longitudinally, respectively, of the wall (see Figure 8) so as to produce a non-extensible reinforcing structure which will effectively oppose any breaking tendency in the wall. In the case of the inner wall 12, I apply to the outer face thereof a layer of asbestos-fibre cement 55 in which are embedded strips 56 of metal fabric material, each strip 56 having one portion thereof also embedded between the courses of material forming the wall 12 (see Figure 6), and the outer portion of each strip extending vertically within the cement facing 55. The inner wall 12 being subjected to higher temperatures than the outer wall 11, the lines of the fabric strips 56 are arranged diagonally with reference to the transverse lines of said wall 12 (see Figure 7), so as to leave a limited opportunity for expansion, but not to an extent to permit any appreciable opening or break in the wall, while the character of the fibre cement facing 55 will permit little or no fracture in the outer face of the wall. Thus an inner wall structure is provided in which the danger of wasteful cracks or fissures is practically eliminated, and also further protection against loss of heat is afforded by the heat-insulating properties of the asbestos-fibre cement facing 55, in addition to the dead air space 14 between said wall and the outer wall 11. Preferably also the feature of the reinforced fibre-cement is carried on out through the side walls of the oven above the dead air wall 14 and over the top of the oven, as illustrated in Figures 1 and 5, the inner portions of the fabric strips 56 being embedded between the successive courses of the tiling 36.

It will thus be apparent that I have devised an efficient arrangement and construction for carrying out the desired objects of the invention. When the oven is fired for baking purposes, the heat is conducted by way of the flue passages 19 to each of the chambers 32, and is at once deflected toward the inner side of each chamber at the front of the oven over that part of the oven chamber 30 which is adjacent the feed door and which ordinarily can not be kept at as high a temperature as is desired. From the inner front corners of the chambers 32 the hot-air flow is directed by the deflecting partitions 39 toward the middle of the chambers and to the outer sides thereof, and thence across the rear ends of said chambers to the inner sides thereof and back on the inner sides of the partitions 39 to the front ends of the chambers, where the openings 40 provide outlets to the flue passage 41. By means of this control of the circulation of the hot-air flow over the oven chamber, a hotter degree of heat is maintained in the vicinity of the feed passage to said chamber, and the rear corners of said chamber are likewise maintained at a higher temperature than could otherwise be secured. The object of this feature of the construction is of course to effect a more uniform baking operation with reference to all the contents of the oven chamber, for which purpose it is essential not only to distribute the heat as evenly as possible over the rear end of the oven chamber but also to maintain a relatively higher temperature at the front end of the chamber where the product to be baked is subjected to the baking action for a relatively shorter time than the product at the rear of the chamber. This is especially true of the space around the feed door, and the present improved construction aims to keep up the temperature at this point by directing the hot-air flow from the passages 19 immediately over to those points overlying the middle of the front end of the oven chamber. The dampers 44 may be regulated to control the heated air circulation in either or both of the chambers 32, and the provision of the damper 43 in the stack affords a further means to check the outlet from the flue passage 41 and retain the heated condition of the entire upper portion of the oven structure.

Obviously the efficiency of the improved construction is greatly enhanced by the above-described reinforced structure of both the outer and inner walls 11 and 12, which prevents the formation of openings or fissures therein and thereby eliminates the wasteful losses due to the escape of the heat through such defects in the walls.

While I have herein illustrated and described what is now deemed to constitute the preferred form of embodiment of the proposed improvements, I desire to expressly reserve the right to make all such changes or modifications as may fairly fall within the scope of the appended claims.

What I claim is:

1. In a bake oven, a wall structure comprising successive layers of material in superposed relation, and layers of reinforcing material interposed at intervals between said first layers of material, said reinforcing material comprising metal fabric having the lines of the fabric extending directly transversely and longitudinally, respectively, of the wall.

2. In a bake oven, a wall structure comprising inner and outer walls spaced apart and leaving a dead air space between them, one of said walls having a facing of asbestos fibre cement applied thereto within said dead air space.

3. In a bake oven, a wall structure comprising inner and outer walls spaced apart and leaving a dead air space between them, the outer wall comprising successive layers of material in superposed relation with layers of reinforcing metal fabric interposed at intervals between said first layers of material and having the lines of fabric extending directly transversely and longitudinally, respectively, of the wall, the inner of said walls having a facing of asbestos fibre cement applied to the exterior face of the wall.

4. In a bake oven, a wall structure having a facing of asbestos fibre cement applied to the exterior of the wall, and strips of metal fabric embedded in said cement, a portion of each of said strips being also embedded in said wall.

5. In a bake oven, a wall structure comprising successive layers of material in superposed relation, a facing of asbestos fibre cement applied to the exterior of the wall, and strips of metal fabric interposed between said layers of material and having the outer portions of said strips bent at right angles and embedded in said cement.

6. In a bake oven, a wall structure having a facing of asbestos fibre cement applied to the exterior of the wall, and strips of extensible metal fabric having a portion of each strip embedded in said cement and the remaining portion of each strip attached to the wall.

7. In a bake oven, a wall structure having a facing of asbestos fibre cement applied to the exterior of the wall, and strips of reinforcing metal fabric having a portion of each strip embedded in said cement and the remaining portion of each strip embedded in the wall, the lines of fabric of said reinforcing strips extending diagonally with reference to the transverse lines of the wall.

8. In a bake oven, a wall structure comprising successive layers of material in superposed relation, a facing of asbestos fibre cement applied to the exterior of the wall, and strips of metal fabric interposed between said layers of material and having the outer portions of said strips bent at right angles and embedded in said cement, the lines of fabric of said strips extending diagonally with reference to the transverse lines of the wall.

9. In a bake oven, a wall structure having a facing of asbestos fibre cement applied to the exterior of the wall, and strips of extensible metal fabric material embedded within said cement facing.

10. In a bake oven, a wall structure comprising inner and outer walls spaced apart and leaving a dead air space between them, the outer face of the inner wall having a facing of asbestos fibre cement applied thereto, and strips of metal fabric embedded in said cement, a portion of each of said strips being embedded in said inner wall.

In witness whereof I hereto affix my signature.

HENRY FREDRICK SOMMER.